2,843,575
FLUOROPRENE COPOLYMERS

John M. Hoyt, Woodside, N. Y., assignor, by mesne assignments, to Minnesota Mining and Manufacturing Company, St. Paul, Minn., a corporation of Delaware No Drawing. Application April 23, 1956
Serial No. 579,746

12 Claims. (Cl. 260—87.5)

This invention relates to halogen-containing polymeric compositions. In one aspect, the invention relates to polymeric fluoroprene compositions. More particularly in this aspect, the invention relates to elastomeric polymeric fluoroprene compositions and the method for their manufacture.

It is an object of this invention to provide new and useful polymeric fluoroprene compositions having desirable chemical and physical characteristics.

Another object of the invention is to provide new and useful polymeric fluoroprene compositions, possessing elastomeric properties together with good chemical and physical characteristics, and which can be easily fabricated into a wide variety of useful articles of improved chemical and physical stability.

Still another object of this invention is to provide new and useful polymeric fluoroprene compositions serving as protective coatings having the aforementioned characteristics and which can be readily applied to the surfaces of a wide variety of useful articles.

Still another object of the invention resides in a process for obtaining these polymeric compositions in good yields.

Various other objects and advantages inherent in the invention will become apparent to those skilled in the art from the accompanying description and disclosure.

It has now been found that the copolymerization of fluoroprene and a perhalogenated ethylene having at least three fluorine atoms, such as trifluorochloroethylene or tetrafluoroethylene, under the conditions more fully hereinafter described, produces an elastomeric polymeric fluoroprene composition possessing good chemical and physical stability, and resistance to oils, fuels and various strong chemical reagents. These polymeric products of fluoroprene with either trifluorochloroethylene or tetrafluoroethylene constitute valuable macromolecules and are adaptable to a wide variety of commercial uses. They possess low temperature flexibility in addition to the aforementioned properties of chemical and physical stability and resistance to oil and hydrocarbon fuels. They are also selectively soluble in various commercial solvents and serve as durable, flexible, protective coatings on surfaces which are subjected to environmental conditions in which they may come into contact with any of the aforementioned corrosive substances.

In general, as more fully hereinafter disclosed, the polymeric compositions of the present invention are produced from the polymerization of monomeric mixtures containing fluoroprene with either trifluorochloroethylene or tetrafluoroethylene as a comonomer, at temperatures between about $-20°$ C. and about $150°$ C., with intermediate temperature ranges being selected with reference to the specific polymerization system employed. The most useful elastomeric polymeric compositions of the present invention are copolymers produced from monomeric mixtures containing between about 5 mole percent and about 80 mole percent fluoroprene and the remaining major constituent being either trifluorochloroethylene or tetrafluoroethylene. The preferred elastomeric copolymeric compositions of the present invention are copolymers produced from monomeric mixtures containing between about 15 mole percent and about 80 mole percent fluoroprene and the remaining major constituent being either trifluorochloroethylene or tetrafluoroethylene.

In producing elastomeric copolymeric compositions from the aforementioned monomeric mixtures containing between about 5 mole percent and about 80 mole percent fluoroprene and the remaining major constituent being either of the aforementioned comonomers, it is found that the finished elastomeric product contains between about 50 mole percent and about 95 mole percent fluoroprene and the remaining major constituent being either trifluorochloroethylene or tetrafluoroethylene. In producing elastomeric copolymeric compositions from the aforementioned monomeric mixtures containing between about 15 mole percent and about 80 mole percent fluoroprene and the remaining major constituent being either of the aforementioned comonomers, it is found that the finished elastomeric product contains between about 65 mole percent and about 95 mole percent fluoroprene and the remaining major constituent being either trifluorochloroethylene or tetrafluoroethylene.

The criticality of the aforementioned monomeric feed ratios to produce the elastomeric fluoroprene copolymers of the present invention, will become apparent from the fact that although the high chemical and physical stability and resistance to strong chemical reagents of trifluorochloroethylene and tetrafluoroethylene is well-known, nevertheless, it is found that the fluoroprene content of the copolymeric compositions must be at least 50 mole percent in order to obtain a copolymeric product that possesses the desired elasticity and extensibility in addition to the above-mentioned properties of physical and chemical resistance to strong reagents.

The elastomeric polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of a metallic salt of an aliphatic acid having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water suspension type recipe systems, are polyfluorocarboxylic acids (e. g., perfluorooctanoic acid) or perfluorochlorocarboxylic acid salts (e. g., trifluorochloroethylene telomer acid soaps). The polyfluorocarboxylic acids which may be employed are such as those disclosed in U. S. Patent No. 2,559,752; and the non-acidic derivative of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under alkaline conditions. It is desirable, therefore, that the pH be maintained between about 7 and 11 in order to prevent gelling of the resulting polymeric product, a condition which often causes slowdown or stoppage of the polymerization reaction. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, trichloroacetyl peroxide, 2,4-dichlorobenzoyl peroxide and dichlorofluoroacetyl peroxide, benzoyl peroxide and di-tertiary butyl peroxide.

As previously indicated, the polymerization reaction is carried out, in general, at a temperature between about $-20°$ C. and about $150°$ C. When the polymerization reaction is carried out employing a water-suspension type recipe, temperatures between about $5°$ C. and about $100°$ C. are preferably employed. When the polymerization reaction is carried out in the presence of an organic peroxide initiator in a bulk-type polymerization system, temperatures over the entire range of between about $-20°$ C. and about $150°$ C. are preferably employed depending upon the decomposition temperature of the promoter. The polymerization reactions described herein to produce the polymeric compositions of the present invention are carried out under autogenous conditions of pressure.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Dodecyl mercaptan is preferred.

The following examples are offered for a better understanding in producing the elastomeric copolymeric compositions of the present invention and are not to be construed as limiting its scope.

*Example I*

A heavy-walled glass polymerization tube of about 20 ml. capacity was flushed with nitrogen and then charged with 9 ml. of a solution which had been prepared by dissolving 25 grams of potassium stearate in 900 ml. of water, adjusting this solution to a pH of 10.2, and thereafter adding 1.5 grams of dodecyl mercaptan. The 9 ml. of the soap-mercaptan solution in the polymerization tube was then frozen, and the tube was then charged with 1 ml. of a promoter solution, prepared by dissolving 1.5 grams of potassium persulfate in 100 ml. of water. The contents of the tube were then refrozen, and the tube was next connected to a gas-transfer system and evacuated at liquid nitrogen temperature. To the frozen contents of the tube were added, by distillation, 1.91 grams of fluoroprene and 3.09 grams of trifluorochloroethylene, which comprised a 1:1 mole ratio. After the contents of the tube were thoroughly frozen with liquid nitrogen, the tube was evacuated and sealed.

The polymerization tube and contents were agitated in a temperature-regulated water-bath at $50°$ C. for a period of 73 hours. At the end of this time, the contents of the tube were coagulated by freezing. The coagulated product was then removed from the tube, washed with hot water and then dried to constant weight in vacuo at $35°$ C. A copolymeric rubbery product was obtained which was found, upon analysis, to comprise 78 mole percent fluoroprene, and the remaining major constituent, trifluorochloroethylene, being present in an amount of approximately 22 mole percent. The copolymer was obtained in an amount corresponding to an 18 percent conversion.

*Example II*

Employing the procedure set forth in Example I and the same polymerization system, the tube was charged with 2.09 grams of fluoroprene and 2.90 grams of tetrafluoroethylene, which comprised a comonomer mixture containing 50 mole percent fluoroprene and 50 mole percent tetrafluoroethylene. The polymerization reaction was carried out at a temperature of $50°$ C. for a period of 96 hours. The resultant elastomeric product was worked-up in accordance with the same procedure as set forth in Example I. A rubbery product was obtained and, upon analysis, was found to comprise approximately 78 mole percent fluoroprene, and the remaining major constituent, tetrafluoroethylene, being present in an amount of approximately 22 mole percent. The copolymer was obtained in an amount corresponding to a 30 percent conversion.

*Example III*

A heavy-walled glass polymerization tube of about 20 ml. capacity was flushed with nitrogen and then charged with 5 ml. of a soap solution prepared by dissolving 5 grams of potassium stearate in 100 ml. of water, and adjusted to a pH of 11. The soap solution in the glass polymerization tube was then frozen. To the frozen contents of the tube were then charged 4 ml. of a solution of potassium persulfate, prepared by dissolving 1 gram of potassium persulfate in 80 ml. of water. Thereafter, 1 ml. of a solution of sodium metabisulfite was added, which had been prepared by dissolving 0.4 gram of sodium metabisulfite in 20 ml. of water. Thereafter, the contents of the tube were refrozen in liquid nitrogen. The tube was then connected to a gas-transfer system and evacuated at liquid nitrogen temperature. To the frozen contents of the tube were added, by distillation, 1.25 grams of fluoroprene and 3.75 grams of trifluorochloroethylene, which comprised a comonomer mixture containing 35 mole percent fluoroprene and 65 mole percent trifluorochloroethylene.

The polymerization tube was then sealed under vacuum and agitated in a temperature-regulated water-bath at 50° C. for a period of 24 hours. At the end of this time, the contents of the tube were coagulated by freezing. The coagulated product was then removed from the tube, washed with hot water and then dried to constant weight in vacuo at 35° C. A copolymeric elastomeric product was obtained which was found, upon analysis, to comprise 80.5 mole percent fluoroprene, and the remaining major constituent, trifluorochloroethylene, being present in an amount of approximately 19.5 mole percent. The copolymer was obtained in an amount corresponding to a 20 percent conversion.

A sample of the raw copolymer was compression molded at 250° F. for a period of approximately 10 minutes. After molding, the sample retained its rubbery characteristics. Gehman stiffness of the molded sample of raw copolymer determined according to ASTM Designation, D–1053–49T, was as follows:

$T_2 = -14°$ C.; $T_5 = -21.5°$ C.;
$T_{10} = -24.5°$ C.; $T_{100} = -33.5°$ C.

Example IV

Employing the procedure set forth in Example III and the same polymerization system, the tube was charged with 3.25 grams of fluoroprene and 1.75 grams of trifluorochloroethylene, which comprised a comonomer mixture containing 75 mole percent fluoroprene and 25 mole percent trifluorochloroethylene. The copolymerization reaction was carried out at a temperature of 50° C. for a period of 25 hours. The resultant elastomeric product was worked-up in accordance with the same procedure as set forth in Example III. A rubbery product was obtained and, upon analysis, was found to comprise approximately 93 mole percent fluoroprene, and the remaining major constituent, trifluorochloroethylene, being present in an amount of approximately 7 mole percent. The copolymer was obtained in an amount corresponding to a 40 percent conversion.

A sample of the raw copolymer was compression molded at 250° F. for approximately 10 minutes. After molding, the sample retained its rubbery characteristics. A volume increase of 69.1 percent was observed in the molded sample when tested by ASTM Designation, D–471–49T, in ASTM Type II Fuel, consisting of isooctane (60% by volume), benzene (5% by volume), toluene (20% by volume) and xylene (15% by volume). Gehman stiffness of the molded sample of raw copolymer, determined according to ASTM Designation, D–1053–49T, was as follows:

$T_2 = -5°$ C.; $T_5 = -12°$ C.;
$T_{10} = -16.5°$ C.; $T_{100} = -27°$ C.

Example V

Employing the procedure set forth in Example III and the same polymerization system, the tube was charged with 1.46 grams of fluoroprene and 3.54 grams of trifluorochloroethylene, which comprises a comonomer mixture containing 40 mole percent fluoroprene and 60 mole percent trifluorochloroethylene. The polymerization reaction was carried out at a temperature of 50° C. for a period of 24 hours. The resultant elastomeric product was worked-up in accordance with the same procedure as set forth in Example III. A rubbery product was obtained and, upon analysis, was found to comprise approximately 82 mole percent fluoroprene, and the remaining major constituent, trifluorochloroethylene, being present in an amount of approximately 18 mole percent. The copolymer was obtained in an amount corresponding to a 28 percent conversion.

A sample of the raw copolymer was compression molded at 250° F. and for a period of approximately 10 minutes. After molding, the sample retained its rubbery characteristics. A volume increase of 92.7% was observed in the molded sample, when tested by ASTM Designation, D–471–49T, in ASTM Type II Fuel, described above.

Example VI

Employing the procedure set forth in Example III and the same polymerization system, a tube was charged with 2.09 grams of fluoroprene and 2.91 grams of tetrafluoroethylene, which comprised a 50/50 molar ratio. The polymerization reaction was carried out at a temperature of 25° C. for a period of 96 hours. The resultant elastomeric copolymer was worked-up in accordance with the same procedure set forth in Example III. A rubbery product was obtained and, upon analysis, was found to comprise approximately 90.5 mole percent fluoroprene, and the remaining major constituent, tetrafluoroethylene, being present in an amount of approximately 9.5 mole percent. The copolymer was obtained in an amount corresponding to a 50 percent conversion.

As previously indicated, the polymeric compositions of the present invention possess highly desirable physical and chemical properties which make them useful for fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about 250° F. and about 400 °F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the polymeric compositions of the present invention reside in the fabrication of belting, hose, mountings, piston and pump-valves, sheet and valve-disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. A process for producing an elastomeric polymer which comprises polymerizing a monomeric mixture of fluoroprene and a perhalogenated ethylene selected from the group consisting of trifluorochloroethylene and tetrafluoroethylene, said mixture containing between about 5 mole percent and about 80 mole percent fluoroprene and the remaining major constituent consisting essentially of the perhalogenated ethylene, in the presence of a free radical forming polymerization promoter at a temperature between about —20° C. and about 150° C.

2. A process for producing an elastomeric polymer which comprises polymerizing a monomeric mixture of fluoroprene and a perhalogenated ethylene selected from the group consisting of trifluorochloroethylene and tetrafluoroethylene, said mixture containing between about 15 mole percent and about 80 mole percent fluoroprene and the remaining major constituent consisting essentially of the perhalogenated ethylene, in the presence of a free radical forming polymerization promoter at a temperature between —20° C. and about 150° C.

3. A process for producing an elastomeric polymer which comprises polymerizing a monomeric mixture of fluoroprene and trifluorochloroethylene, said mixture containing between about 5 mole percent and about 80 mole percent fluoroprene and the remaining major constituent consisting essentially of trifluorochloroethylene, in the presence of a free radical forming polymerization promoter at a temperature between about —20° C. and about 150° C.

4. A process for producing an elastomeric polymer which comprises polymerizing a monomeric mixture of fluoroprene and trifluorochloroethylene, said mixture containing between about 15 mole percent and about 80 percent fluoroprene and the remaining major constituent consisting essentially of trifluorochloroethylene, in the presence of a free radical forming polymerization promoter at a temperature between about —20° C. and about 150° C.

5. A process for producing an elastomeric polymer which comprises polymerizing a monomeric mixture of fluoroprene and tetrafluoroethylene, said mixture containing between about 5 mole percent and about 80 mole percent fluoroprene and the remaining major constituent consisting essentially of tetrafluoroethylene, in the presence of a free radical forming polymerization promoter at a temperature between about —20° C. and about 150° C.

6. A process for producing an elastomeric polymer which comprises polymerizing a monomeric mixture of fluoroprene and tetrafluoroethylene, said mixture containing between about 15 mole percent and about 80 mole percent fluoroprene and the remaining major constituent consisting essentially of tetrafluoroethylene, in the presence of a free radical forming polymerization promoter at a temperature between about —20° C. and about 150° C.

7. An elastomeric copolymer of about 50 mole percent to about 95 mole percent fluoroprene and correspondingly about 50 mole percent to about 5 mole percent of a perhalogenated ethylene selected from the group consisting of trifluorochloroethylene and tetrafluoroethylene.

8. An elastomeric copolymer of about 65 mole percent to about 95 mole percent fluoroprene and correspondingly about 35 mole percent to about 5 mole percent of a perhalogenated ethylene selected from the group consisting of trifluorochloroethylene and tetrafluoroethylene.

9. An elastomeric copolymer of about 50 mole percent to about 95 mole percent fluoroprene and correspondingly about 50 mole percent to about 5 mole percent trifluorochloroethylene.

10. An elastomeric copolymer of about 65 mole percent to about 95 mole percent fluoroprene and correspondingly about 35 mole percent to about 5 mole percent trifluorochloroethylene.

11. An elastomeric copolymer of about 50 mole percent to about 95 mole percent fluoroprene and correspondingly about 50 mole percent to about 5 mole percent tetrafluoroethylene.

12. An elastomeric copolymer of about 65 mole percent to about 95 mole percent fluoroprene and correspondingly about 35 mole percent to about 5 mole percent tetrafluoroethylene.

References Cited in the file of this patent

UNITED STATES PATENTS

| | | |
|---|---|---|
| 2,462,347 | Barrick | Feb. 22, 1949 |
| 2,468,664 | Hanford | Apr. 26, 1949 |
| 2,479,367 | Joyce | Aug. 16, 1949 |

UNITED STATES PATENT OFFICE

CERTIFICATE OF CORRECTION

Patent No. 2,843,575                          July 15, 1958

John M. Hoyt

It is hereby certified that error appears in the printed specification of the above numbered patent requiring correction and that the said Letters Patent should read as corrected below.

Column 7, line 47, for "80 percent" read -- 80 mole percent --.

Signed and sealed this 18th day of November 1958.

(SEAL)
Attest:

KARL H. AXLINE

Attesting Officer

ROBERT C. WATSON
Commissioner of Patents